(12) United States Patent
Toraya et al.

(10) Patent No.: US 11,841,334 B2
(45) Date of Patent: Dec. 12, 2023

(54) QUANTITATIVE PHASE ANALYSIS DEVICE, QUANTITATIVE PHASE ANALYSIS METHOD, AND NON-TRANSITORY COMPUTER-READABLE STORAGE MEDIUM STORING QUANTITATIVE PHASE ANALYSIS PROGRAM

(71) Applicant: Rigaku Corporation, Akishima (JP)

(72) Inventors: Hideo Toraya, Tachikawa (JP); Norihiro Muroyama, Ome (JP)

(73) Assignee: RIGAKU CORPORATION, Tokyo (JP)

( * ) Notice: Subject to any disclaimer, the term of this patent is extended or adjusted under 35 U.S.C. 154(b) by 620 days.

(21) Appl. No.: 16/785,769

(22) Filed: Feb. 10, 2020

(65) Prior Publication Data

US 2020/0173938 A1 Jun. 4, 2020

Related U.S. Application Data

(63) Continuation of application No. PCT/JP2018/019359, filed on May 18, 2018.

(30) Foreign Application Priority Data

Aug. 9, 2017 (JP) .................................. 2017-154292

(51) Int. Cl.
*G01N 23/2055* (2018.01)
*G01N 23/207* (2018.01)
(52) U.S. Cl.
CPC ....... *G01N 23/2055* (2013.01); *G01N 23/207* (2013.01); *G01N 2223/633* (2013.01)
(58) Field of Classification Search
CPC ............ G01N 23/2055; G01N 23/207; G01N 2223/0566; G01N 2223/62; G01N 2223/633; G01N 2223/605; G01N 23/633
See application file for complete search history.

(56) References Cited

U.S. PATENT DOCUMENTS 7,206,378 B2 * 4/2007 Obata .............. G01N 23/20016
378/162
2003/0235270 A1 * 12/2003 Toraya ................. G01N 23/207
378/73

(Continued)

FOREIGN PATENT DOCUMENTS

JP 2013122403 A 6/2013
JP 2014178203 A 9/2014

OTHER PUBLICATIONS

Hideo Toraya, "A new method for quantitative phase analysis using X-ray powder diffraction: direct derivation of weight fractions from observed integrated intensities and chemical compositions of individual phases", Journal of Applied Crystallography, 49, 1508-1516 (Year: 2016).*

(Continued)

*Primary Examiner* — Dani Fox
*Assistant Examiner* — Soorena Kefayati
(74) *Attorney, Agent, or Firm* — CANTOR COLBURN LLP (57) ABSTRACT

A quantitative phase analysis device includes: a unit for acquiring a powder diffraction pattern of the sample; a unit for acquiring information on a plurality of crystalline phases; a unit for acquiring a fitting function for each of the plurality of crystalline phases; a unit for executing whole-powder pattern fitting for the powder diffraction pattern by using the acquired fitting functions, to thereby acquire a fitting result; and a unit for calculating a weight ratio of the plurality of crystalline phases based on the fitting result. Each fitting function is selected from the group consisting of a first fitting function using an integrated intensity obtained by whole-powder pattern decomposition, a second fitting function using an integrated intensity obtained by observa- (Continued)

tion or calculation, and a third fitting function using a profile intensity obtained by observation or calculation.

4 Claims, 6 Drawing Sheets

(56) References Cited

U.S. PATENT DOCUMENTS

| | | | | |
|---|---|---|---|---|
| 2006/0032433 | A1* | 2/2006 | Sakata | G01N 23/207 117/89 |
| 2007/0270397 | A1* | 11/2007 | Bates | G01N 23/207 514/210.01 |
| 2010/0246768 | A1* | 9/2010 | Toraya | B82Y 10/00 378/83 |
| 2011/0054805 | A1* | 3/2011 | McClurg | G01N 23/207 702/30 |
| 2011/0064199 | A1* | 3/2011 | Ida | G01N 23/207 378/75 |
| 2012/0002787 | A1* | 1/2012 | Kern | G01N 23/20 250/390.09 |
| 2013/0197817 | A1* | 8/2013 | Billinge | G16C 99/00 702/28 |
| 2014/0114602 | A1* | 4/2014 | Billinge | G01N 23/207 702/104 |
| 2014/0278147 | A1* | 9/2014 | Sasaki | G01N 23/207 702/28 |
| 2015/0146861 | A1* | 5/2015 | Kobayashi | G01N 23/207 378/79 |
| 2018/0356354 | A1* | 12/2018 | Doi | G01N 23/201 |

OTHER PUBLICATIONS

Ortiz et al., "Quantitative polytype-composition analyses of SiC using X-ray diffraction: a critical comparison between the polymorphic and the Rietveld methods", Journal of the European Ceramic Society, vol. 21, No. 9; Sep. 2001; pp. 1237-1248.

Scardi et al., "Powder Diffraction in Mining and Minerals", Newsletters Commission on Powder Diffraction, Newsletter No. 27; Jun. 2002; pp. 1-47.

EPO Extended European Search Report for corresponding EP Application No. 18844423.6; dated Jul. 20, 2020.

Alexander, L. E. & Klug, H. P., Anal. Chem., 1948, No. 20, p. 886-889.

Chung, F. H., "Quantitative Interpretation of X-ray Diffraction Patterns of Mixtures. I. Matrix-Flushing Method for Quantitative Multicomponent Analysis", J. Appl. Cryst., 1974, No. 7, pp. 519 to 525.

Chung, F. H., "Quantitative Interpretation of X-ray Diffraction Patterns of Mixtures. II. Adiabatic Principle of X-ray Diffraction Analysis of Mixtures", J. Appl. Cryst., 1974, No. 7, pp. 526 to 531.

Hideo Toraya, "A new method for quantitative phase analysis using X-raypowder diffraction: direct derivation of weight fractions from observedintegrated intensities and chemical compositions of individual phases", J.Appl. Cryst., 2016, No. 49, p. 1508-1516.

Hideo Toraya, "Quantitative phase analysis using observed integratedintensities and chemical composition data of individual crystalline phases: quantification of materials with indefinite chemical compositions", J. Appl.Cryst., 2017, No. 50, p. 820-829.

Hill, R. J. and Howard, C. J., "Quantitative Phase Analysis from Neutron Powder Diffraction Data Using the Rietveld Method", J. Appl. Cryst., 1987, No. 20, pp. 467 to 474.

Scarlett, N. V. Y. and Madsen, I. C., "Quantification of phases with partialor no known crystal structure", Powder Diffraction, 2006, No. 21, pp. 278 to 284.

Smith, D. K., Johnson, G. G. Jr., Scheible, A., Wims, A. M., Johnson, J. L.and Ullmann, G., "Quantitative X-Ray Powder Diffraction Method Using theFull Diffraction Pattern", Power Diffr., 1987, No. 2, p. 73-77.

Toraya, H. and Tsusaka S., "Quantitative Phase Analysis using the Whole-Powder-Pattern Decomposition Method. I. Solution from Knowledge of Chemical Compositions", J. Appl. Cryst., 1995, No. 28, pp. 392 to 399.

Werner, P.- E., Salome, S., Malmros, G., and Thomas, J. O., "Quantitative Analysis of Multicomponent Powders by Full-Profile Refinement of Guinier-Hagg X-ray Film Data", J. Appl. Cryst., 1979, No. 12, pp. 107 to 109.

International Search Report for International Application No. PCT/JP2018/019359; dated Jul. 24, 2018.

* cited by examiner

| CRISTALLINE PHASE | ROCK-FORMING MINERAL | CHEMICAL COMPOSITION | WEIGHT FRACTION $w_k(\%)$ | | | FITTING FUNCTION |
|---|---|---|---|---|---|---|
| | | | WEIGHT VALUE | ANALYSIS VALUE | DIFFERENCE | |
| A | Quartz | $SiO_2$ | 50.00 | 51.23 | 1.23 | FIRST FITTING FUNCTION |
| B | Albite | $NaSi_3AlO_8$ | 39.97 | 39.12 | -0.85 | SECOND FITTING FUNCTION |
| C | Kaolinite | $Al_4Si_4O_{10}(OH)_8$ | 10.03 | 9.65 | -0.38 | THIRD FITTING FUNCTION |
| | | | | | 0.89 | |

QUANTITATIVE PHASE ANALYSIS DEVICE, QUANTITATIVE PHASE ANALYSIS METHOD, AND NON-TRANSITORY COMPUTER-READABLE STORAGE MEDIUM STORING QUANTITATIVE PHASE ANALYSIS PROGRAM

CROSS-REFERENCE TO RELATED APPLICATION

This application is a continuation application of International Application PCT/JP2018/019359 filed on May 18, 2018, which claims priority from Japanese patent application JP2017-154292 filed on Aug. 9, 2017. The contents of these applications are incorporated herein by reference in their entirety.

BACKGROUND

1. Field

The disclosure relates to a quantitative phase analysis device, a quantitative phase analysis method, and a quantitative phase analysis program, which are configured to perform quantitative phase analysis of crystalline phases contained in a sample based on a powder diffraction pattern of the sample.

2. Description of the Related Art

When a sample is a mixture sample containing a plurality of crystalline phases, a powder diffraction pattern of the sample is acquired, for example, by measurement using an X-ray diffractometer. The powder diffraction pattern of a crystalline phase is specific to the crystalline phase, and the powder diffraction pattern of the sample is a powder diffraction pattern acquired by adding up powder diffraction patterns of the plurality of crystalline phases contained in the sample based on contents. In the present application, the "crystalline phase" refers to a crystalline pure substance solid and has a chemical composition and a crystal structure.

Qualitative phase analysis involves analyzing which crystalline phase exists in the sample. Quantitative phase analysis involves analyzing in which quantitative ratio the plurality of crystalline phases contained in the sample exist. In this case, as the premise for performing quantitative phase analysis, it is assumed that qualitative phase analysis of the crystalline phases contained in the sample has been performed.

In Literatures 1 and 2 listed below, there is a description regarding an intensity-composition (IC) formula to be used in the disclosure. The IC formula is described below. It is assumed that K (K represents an integer of 2 or more) crystalline phases are contained in a powder sample, and a j-th (j represents an integer of 1 or more) diffraction line of a k-th (k represents an integer of 1 or more and K or less) crystalline phase has an integrated intensity $I_{jk}$. The integrated intensity $I_{jk}$ of each diffraction line (j-th diffraction line of k-th crystalline phase) in a powder diffraction pattern of the sample is given by the following Expression 1 in the case of X-ray powder diffraction having an optical system based on the Bragg-Brentano geometry.

$$I_{jk} = I_0 \frac{Q}{\mu} \frac{V_k}{U_k^2} G_{jk}^{-1} m_{jk} |F_{jk}|^2 \qquad (1)$$

In Expression 1, "$I_0$" represents an incident X-ray intensity, "$V_k$" represents an irradiated volume of a k-th crystalline phase, "Q" represents a constant including an incident X-ray intensity, a physical constant, for example, the speed of light, and an optical system parameter, "$\mu$" represents a linear absorption coefficient of the powder sample, "$U_k$" represents a unit cell volume of the k-th crystalline phase, "$m_{jk}$" represents a multiplicity of reflection, and "$F_{jk}$" represents a crystal structure factor. $G_{jk}$ is defined by the following Expression 2 by using a Lorentz-polarization factor (hereinafter referred to as "Lp factor") $Lp_{jk}$ and a factor ($\sin \theta_{jk}$) relating to a width of a receiving slit.

$$G_{jk} = \frac{\sin\theta_{jk}}{Lp_{jk}} = \frac{2\sin\theta_{jk}\sin 2\theta_{jk}}{1+\cos^2 2\theta_{jk}} \qquad (2)$$

Expression 2 is based on the assumption that an optical system, in which a one-dimensional detector is placed on the diffraction side, is employed, and it is to be understood that the expression is modified for an optical system in which a monochromator is placed on the diffraction side.

A weight factor ($W_k$) of the k-th crystalline phase corresponding to the irradiated volume $V_k$ is calculated to be $W_k = V_k d_k$ by multiplying the irradiated volume $V_k$ by a material density $d_k (= Z_k M_k / U_k)$ of the k-th crystalline phase. The volume fraction $V_k$ is $V_k = W_k U_k / (Z_k M_k)$, and Expression 1 is transformed into the following Expression 3. The number of chemical formula unit is represented by "$Z_k$", and a chemical formula weight is represented by "$M_k$".

$$I_{jk} = I_0 \frac{Q}{\mu} \frac{W_k}{Z_k M_k U_k} G_{jk}^{-1} m_{jk} |F_{jk}|^2 \qquad (3)$$

The following Expression 4 is obtained by multiplying both sides of Expression 3 by $G_{jk}$, and taking the sum for the k-th crystalline phase.

$$\sum_{j=1}^{N_k} I_{jk} G_{jk} = I_0 \frac{Q}{\mu} \frac{W_k}{M_k} \frac{1}{Z_k} \left[ \frac{1}{U_k} \sum_{j=1}^{N_k} m_{jk} |F_{jk}|^2 \right] \qquad (4)$$

In this expression, "$N_k$" represents the number of diffraction lines of the k-th crystalline phase (j is thus an integer of 1 or more and $N_k$ or less). Ideally, $N_k$ is the total number of diffraction lines of the k-th crystalline phase. However, in actuality, the range of 2θ of the powder diffraction pattern to be observed is finite. Thus, the sum means a finite sum, and $N_k$ may be the number of diffraction lines in the range of 2θ, which is selected by a user. It suffices that the range of 2θ includes a sufficient number of diffraction lines required for performing quantitative phase analysis. Further, there may be an actually existing diffraction line that is not included in the sum as required.

Terms inside the square brackets of the right side of Expression 4 correspond to a peak height of the Patterson function at the origin. When the peak height is approximated by an integrated value of that peak, the amount is proportional to an amount obtained by taking a sum of squares of the number ($n_{jk}$) of electrons belonging to individual atoms inside a chemical formula unit. Thus, when a constant of proportionality is represented by "C", the following Expression 5 is satisfied.

$$\frac{1}{Z_k}\left[\frac{1}{U_k}\sum_{j=1}^{N_k} m_{jk}|F_{jk}|^2\right] \cong C\sum_{i=1}^{N_k^A} n_{ik}^2 \quad (5)$$

In this expression, "$N_{kA}$" represents the total number of atoms inside the chemical formula unit of the k-th crystalline phase. Further, the substance parameter $a_k$ is defined by the following Expression 6.

$$a_k = M_k\left(\sum_{i=1}^{N_k^A} n_{ik}^2\right)^{-1} \quad (6)$$

Here, the substance parameter $a_k$ represents a physical quantity specific to the crystalline phase (substance). Thus, the substance parameter may be referred to as "crystalline phase factor". Further, the parameter $S_k$ is defined by the following Expression 7.

$$S_k = \sum_{j=1}^{N_k} I_{jk} G_{jk} \quad (7)$$

A weight ratio of K crystalline phases contained in the sample can be calculated based on the weight factor $W_k$. In this case, the weight ratio of the K crystalline phases may be calculated as "$W_1:W_2:\ldots:W_K$". Alternatively, it is possible to select a part of the K crystalline phases and determine a weight ratio thereof. Further, when the sample does not contain an amorphous component, and all the crystalline phases contained in the sample are subjected to quantitative phase analysis, the weight of entire sample can be relatively represented by a sum "$\Sigma W_k$", where k takes values of from 1 to K. Thus, a weight fraction $w_k$ of the k-th crystalline phase can be represented by the following Expression 8.

$$w_k = W_k / \Sigma_{k'=1}^{K} W_{k'} \quad (8)$$

When Expression 4 is transformed with respect to the weight factor $W_k$, and Expression 5, Expression 6, and Expression 7 are substituted into Expression 4, the weight fraction $w_k$ is calculated by Expression 9 based on Expression 8. The Expression 9 is the IC formula.

$$w_k = a_k S_k / \Sigma_{k'=1}^{K} a_{k'} S_{k'} \quad (9)$$

CITATION LIST

[Literature 1] Hideo Toraya, "A new method for quantitative phase analysis using X-ray powder diffraction: direct derivation of weight fractions from observed integrated intensities and chemical compositions of individual phases", J. Appl. Cryst., 2016, No. 49, pages 1508 to 1516
[Literature 2] Hideo Toraya, "Quantitative phase analysis using observed integrated intensities and chemical composition data of individual crystalline phases: quantification of materials with indefinite chemical compositions", J. Appl. Cryst., 2017, No. 50, pages 820 to 829
[Literature 3] Alexander, L. E. & Klug, H. P., Anal. Chem., 1948, No. 20, pages 886 to 889
[Literature 4] Chung, F. H., "Quantitative Interpretation of X-ray Diffraction Patterns of Mixtures. I. Matrix-Flushing Method for Quantitative Multicomponent Analysis", J. Appl. Cryst., 1974, No. 7, pages 519 to 525
[Literature 5] Chung, F. H., "Quantitative Interpretation of X-ray Diffraction Patterns of Mixtures. II. Adiabatic Principle of X-ray Diffraction Analysis of Mixtures", J. Appl. Cryst., 1974, No. 7, pages 526 to 531
[Literature 6] Werner, P.-E., Salome, S., Malmros, G., and Thomas, J. O., "Quantitative phase analysis of Multicomponent Powders by Full-Profile Refinement of Guinier-Hagg X-ray Film Data", J. Appl. Cryst., 1979, No. 12, pages 107 to 109
[Literature 7] Hill, R. J. and Howard, C. J., "Quantitative Phase Analysis from Neutron Powder Diffraction Data Using the Rietveld Method", J. Appl. Cryst., 1987, No. 20, pages 467 to 474
[Literature 8] Toraya, H. and Tsusaka S., "Quantitative Phase Analysisusingthe Whole-Powder-Pattern Decomposition Method. I. Solution from Knowledge of Chemical Compositions", J. Appl. Cryst., 1995, No. 28, pages 392 to 399
[Literature 9] Smith, D. K., Johnson, G. G. Jr., Scheible, A., Wims, A. M., Johnson, J. L. and Ullmann, G., "Quantitative X-Ray Powder Diffraction Method Using the Full Diffraction Pattern", Power Diffr., 1987, No. 2, pages 73 to 77
[Literature 10] Scarlett, N. V. Y. and Madsen, I. C., "Quantification of phases with partial or no known crystal structure", Powder Diffraction, 2006, No. 21, pages 278 to 284

The substance parameter $a_k$ given in the IC formula (Expression 9) is a physical quantity specific to the crystalline phase (substance). Thus, the substance parameter may be referred to as "crystalline phase factor". The substance parameter $a_k$ is calculated when the chemical composition of a crystalline phase is determined by qualitative phase analysis. Further, even when the sample contains a crystalline phase (uncertain crystalline phase) whose chemical composition is uncertain, the substance parameter $a_k$ of such a substance may be estimated.

The parameter $S_k$ given in the IC formula (Expression 9) is a physical quantity calculated through measurement (observation). As indicated in Expression 7, when the integrated intensity $I_{jk}$ of each diffraction line is obtained through measurement, the parameter $S_k$ is calculated. When the K crystalline phases contained in the sample are determined through qualitative phase analysis, and the peak position (2θ) of a powder diffraction pattern of each crystalline phase is known, it is possible to determine to which one of the K crystalline phases a plurality of diffraction lines appearing in the powder diffraction pattern belong. Further, when there are superimposed diffraction lines, which are two or more diffraction lines superimposed onto one another, it is possible to calculate the parameter $S_k$ of each crystalline phase with a simple method by equally distributing the integral intensities of superimposed diffraction lines or by distributing the integral intensities of superimposed diffraction lines depending on the volume fraction, for example.

However, in order to perform quantitative phase analysis more accurately, the parameter $S_k$ is desired to be acquired accurately by fitting a calculated powder diffraction pattern to an observed powder diffraction pattern of the sample. There has been known a whole-powder pattern fitting (WPPF) method as a quantitative phase analysis technology using an X-ray powder diffraction method. In the WPPF method, various kinds of parameters are optimized by fitting the calculation pattern for the entire powder diffraction pattern of the observed sample by using a least squares method in general. Now, a description is given of representative examples of the WPPF method.

As described in Literature 3, as a method having high accuracy, an internal (external) standard method has been known. Further, there has been known a simple quantification method involving determining a weight ratio of crystalline phases based on a ratio between a reference intensity ratio (RIR) value compiled into a database and a highest peak intensity. The RIR quantification method using an RIR value is disclosed in Literature 4 and Literature 5. A Rietveld method using all the profile intensities within a measurement angle range has been known. A quantification method using the Rietveld method is disclosed in Literature 6 and Literature 7. Further, a whole-powder pattern decomposition (WPPD) method involving performing quantification based on a scale factor to be multiplied by an observed integrated intensity of each crystalline phase has been known. A quantification method using the whole-powder pattern decomposition method is disclosed in Literature 8. Further, a full-pattern fitting method of performing quantitative phase analysis by fitting the powder diffraction pattern (powder diffraction pattern from which background intensity is removed) of the sample, as the profile intensity as it is, is disclosed in Literature 9.

In the internal (external) standard method, it is required to obtain a sample of each single crystalline phase of a plurality of crystalline phases contained in a sample and to create a calibration curve. Therefore, the internal standard method has a problem of lacking general versatility and rapidity. In the RIR quantification method using an RIR value, an RIR value compiled into a database is required. In the Rietveld method, crystal structural parameters of a plurality of crystalline phases contained in a powder sample are required. In the whole-powder pattern decomposition method, it is required to obtain a sample of a single crystalline phase. As the Rietveld method that is applicable to the case where structural parameters are not obtained with respect to a part of the crystalline phases out of the plurality of crystalline phases, a method using an RIR value with respect to a crystalline phase in which a structural parameter is not obtained, a PONKCS method, or the like has been known. The PONKCS method is disclosed in Literature 10. However, when a structural parameter is not obtained by any of the methods, an actually measured RIR value is required as reference data in the RIR quantification method, and a sample of a single crystalline phase or a sample close thereto is required as reference data in the PONKCS method.

In the related art, crystallographic data such as a calibration curve (internal standard method), the RIR value, or the crystal structure parameter (Rietveld method), which is acquired in an experiment, is required. However, there is a demand for a quantitative phase analysis method enabling quantitative phase analysis by performing whole-powder pattern fitting for the powder diffraction pattern of the sample with a simpler method.

SUMMARY

The disclosure has been made in view of the above-mentioned problem, and has an object to provide a quantitative phase analysis device, a quantitative phase analysis method, and a quantitative phase analysis program, which enable quantitative phase analysis of a sample containing a plurality of crystalline phases to be performed in a simpler manner.

(1) In order to solve the above-mentioned problem, a quantitative phase analysis device according to one embodiment of the disclosure is a quantitative phase analysis device, which is configured to perform quantitative phase analysis of crystalline phases contained in a sample based on a powder diffraction pattern of the sample, the quantitative phase analysis device including: powder diffraction pattern acquisition means for acquiring the powder diffraction pattern of the sample; qualitative phase analysis result acquisition means for acquiring information on a plurality of crystalline phases contained in the sample; fitting function acquisition means for acquiring a fitting function for each of the plurality of crystalline phases; whole-powder pattern fitting means for executing whole-powder pattern fitting for the powder diffraction pattern of the sample by using the fitting function for each of the plurality of crystalline phases, to thereby acquire a fitting result; and weight ratio calculation means for calculating a weight ratio of the plurality of crystalline phases based on the fitting result, wherein the fitting function for each of the plurality of crystalline phases is one fitting function selected from the group consisting of a first fitting function that uses an integrated intensity obtained by whole-powder pattern decomposition, a second fitting function that uses an integrated intensity obtained by observation or calculation, and a third fitting function that uses a profile intensity obtained by observation or calculation.

(2) In the quantitative phase analysis device according to the above-mentioned item (1), the weight ratio calculation means may be configured to calculate a weight fraction by using an intensity-composition (IC) formula.

(3) In the quantitative phase analysis device according to the above-mentioned item (1) or (2), the quantitative phase analysis device may select, for the plurality of crystalline phases, two or more types of fitting functions among the first fitting function to the third fitting function.

(4) A quantitative phase analysis method according to one embodiment of the disclosure is a quantitative phase analysis method for performing quantitative phase analysis of crystalline phases contained in a sample based on a powder diffraction pattern of the sample, the quantitative phase analysis method including: a powder diffraction pattern acquisition step of acquiring the powder diffraction pattern of the sample; a qualitative phase analysis result acquisition step of acquiring information on a plurality of crystalline phases contained in the sample; a fitting function acquisition step of acquiring a fitting function for each of the plurality of crystalline phases; a whole-powder pattern fitting step of executing whole-powder pattern fitting for the powder diffraction pattern of the sample by using the fitting function for each of the plurality of crystalline phases, to thereby acquire a fitting result; and a weight ratio calculation step of calculating a weight ratio of the plurality of crystalline phases based on the fitting result, wherein the fitting function for each of the plurality of crystalline phases may be one fitting function selected from the group consisting of a first fitting function that uses an integrated intensity obtained by whole-powder pattern decomposition, a second fitting function that uses an integrated intensity obtained by observation or calculation, and a third fitting function that uses a profile intensity obtained by observation or calculation.

(5) A quantitative phase analysis program according to one embodiment of the disclosure is a quantitative phase analysis program for performing quantitative phase analysis of crystalline phases contained in a sample based on a powder diffraction pattern of the sample, the quantitative phase analysis program causing a computer to function as: powder diffraction pattern acquisition means for acquiring the powder diffraction pattern of the sample; qualitative phase analysis result acquisition means for acquiring information on a plurality of crystalline phases contained in the sample; fitting function acquisition means for acquiring a fitting function for each of the plurality of crystalline phases; whole-powder pattern fitting means for executing whole-powder pattern fitting for the powder diffraction pattern of the sample by using the fitting function for each of the plurality of crystalline phases, to thereby acquire a fitting result; and weight ratio calculation means for calculating a weight ratio of the plurality of crystalline phases based on the fitting result, wherein the fitting function for each of the plurality of crystalline phases may be one fitting function selected from the group consisting of a first fitting function that uses an integrated intensity obtained by whole-powder pattern decomposition, a second fitting function that uses an integrated intensity obtained by observation or calculation, and a third fitting function that uses a profile intensity obtained by observation or calculation.

According to the disclosure, there are provided the quantitative phase analysis device, the quantitative phase analysis method, and the quantitative phase analysis program, which enable the quantitative phase analysis of the sample containing the plurality of crystalline phases to be performed in a simpler manner.

DETAILED DESCRIPTION

Now, an embodiment of the present invention is described with reference to the drawings. For clearer illustration, some sizes, shapes, and the like are schematically illustrated in the drawings in comparison to actual ones. However, the sizes, the shapes, and the like are merely examples, and do not limit understanding of the present invention. Further, like elements as those described relating to the drawings already referred to are denoted by like reference symbols herein and in each of the drawings, and detailed description thereof is sometimes omitted as appropriate.

Figure 1:
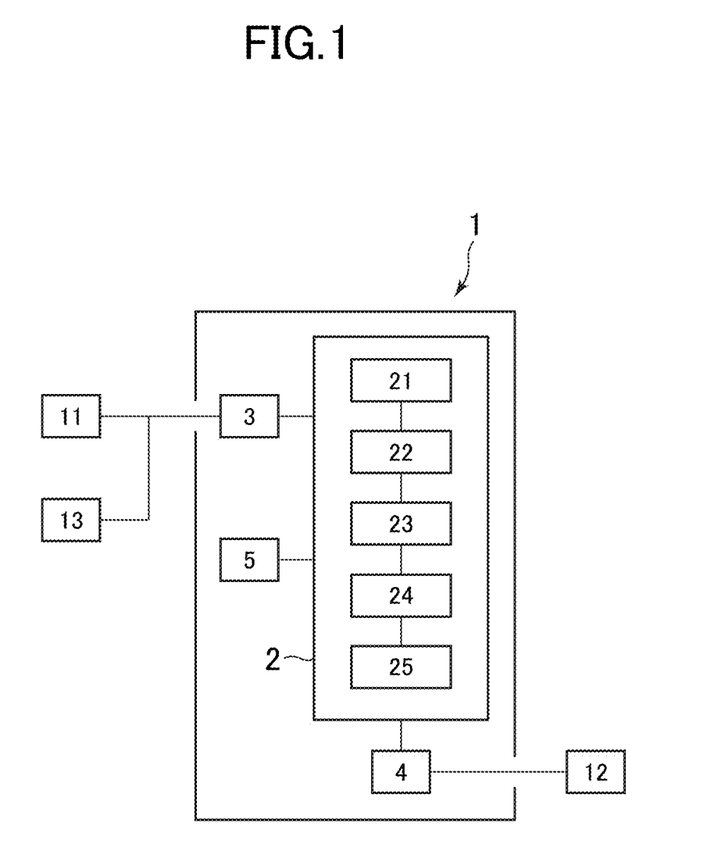
FIG. 1 is a block diagram for illustrating a configuration of a quantitative phase analysis device according to an embodiment of the disclosure.

FIG. 1 is a block diagram for illustrating a configuration of a quantitative phase analysis device 1 according to the embodiment of the present invention. A quantitative phase analysis method according to this embodiment is performed by the quantitative phase analysis device 1 according to this embodiment. That is, the quantitative phase analysis device 1 according to this embodiment is a device capable of simply performing quantitative phase analysis of a sample through use of the quantitative phase analysis method according to this embodiment.

The quantitative phase analysis device 1 according to this embodiment includes an analysis unit 2, an information input unit 3, an information output unit 4, and a storage unit 5. The quantitative phase analysis device 1 is achieved by a computer used in general, and further includes a read only memory (ROM) (not shown) and a random access memory (RAM) (not shown). The ROM and the RAM form internal memories of the computer. The storage unit 5 is a recording medium, and may be formed of a semiconductor memory, a hard disk drive, or other such arbitrary recording medium. In this case, the storage unit 5 is installed inside the computer, but may be installed outside the computer. The storage unit 5 may be a single recording medium, or may be formed of a plurality of recording mediums. The quantitative phase analysis device 1 is connected to an X-ray diffractometer 11 and an input device 13. The X-ray diffractometer 11 is configured to subject a sample having a powder shape to X-ray diffraction measurement to measure X-ray diffraction data on the sample and output the measured X-ray diffraction data to the information input unit 3 of the quantitative phase analysis device 1. The input device 13 is realized with a keyboard, a mouse, a touch panel, or the like. The information input unit 3 is an interface or the like to be connected to the X-ray diffractometer 11 and the input device 13. The analysis unit 2 is configured to acquire the X-ray diffraction data from the information input unit 3 and subject the X-ray diffraction data to preprocessing to generate a powder diffraction pattern of the sample. In this case, the preprocessing refers to processing, for example, smoothing of data, or removal of a $K\alpha 2$ component. The powder diffraction pattern generated by the analysis unit 2 is input and stored in the storage unit 5. The X-ray diffractometer 11 may include an analysis unit (data processing unit), and the analysis unit of the X-ray diffractometer 11 may subject X-ray diffraction data to be measured to preprocessing to generate a powder diffraction pattern of the sample and output the powder diffraction pattern of the sample to the information input unit 3 of the quantitative phase analysis device 1. The analysis unit 2 is configured to acquire the powder diffraction pattern of the sample from the storage unit 5 (or the information input unit 3) and perform quantitative phase analysis of crystalline phases contained in the sample based on the powder diffraction pattern to output a weight ratio of the crystalline phases subjected to quantitative phase analysis to the information output unit 4 as an analysis result. The information output unit 4 is an interface or the like to be connected to a display device 12 and is configured to output the weight ratio of the crystalline phases to the display device 12. The display device 12 is configured to display the analysis result of the quantitative phase analysis.

Figure 2:
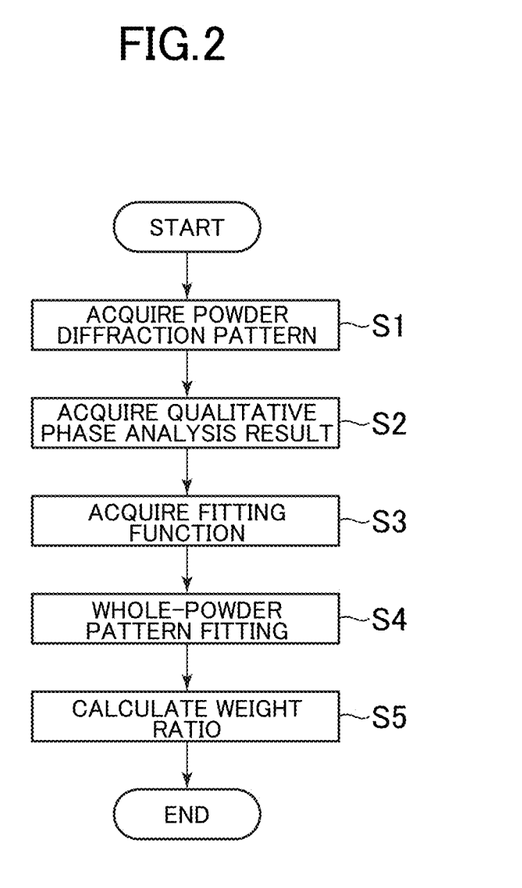
FIG. 2 is a flow chart for illustrating a quantitative phase analysis method according to an embodiment of the disclosure.

FIG. 2 is a flowchart for illustrating the quantitative phase analysis method according to this embodiment. The analysis unit 2 of the quantitative phase analysis device 1 includes a powder diffraction pattern acquisition unit 21, a qualitative phase analysis result acquisition unit 22, a fitting function acquisition unit 23, a whole powder-pattern fitting unit 24, and a weight ratio calculation unit 25, and those units are means for executing each step of the quantitative phase analysis method described below. Further, a quantitative phase analysis program according to this embodiment is a program for causing the computer to function as the respective means.

[Step S1: Powder Diffraction Pattern Acquisition Step]

A powder diffraction pattern of a sample is acquired (S1: powder diffraction pattern acquisition step). The powder diffraction pattern of the sample is stored in the storage unit 5. Alternatively, as described above, the X-ray diffractometer 11 may include an analysis unit (data processing unit) and subject X-ray diffraction data on a sample to be measured to preprocessing to generate a powder diffraction pattern of the sample. Then, the X-ray diffractometer 11 may output the powder diffraction pattern of the sample to the information input unit 3 of the quantitative phase analysis device 1. The analysis unit 2 of the quantitative phase analysis device 1 acquires the powder diffraction pattern of the sample from the storage unit 5 (or the information input unit 3). In the powder diffraction pattern, a horizontal axis represents a diffraction angle 2θ indicating a peak position, and a vertical axis represents a spectrum indicating an intensity of a diffraction X-ray. In this case, the diffraction angle 2θ is an angle formed by an incident X-ray direction and a diffraction X-ray direction. The X-ray diffraction data on the sample measured by the X-ray diffractometer 11 may be input to the information input unit 3 or stored in the storage unit 5. In this case, the analysis unit 2 acquires the X-ray diffraction data on the sample from the information input unit 3 or the storage unit 5 and subjects the X-ray diffraction data on the sample to preprocessing to generate the powder diffraction pattern of the sample.

[Step S2: Qualitative Phase Analysis Result Acquisition Step]

Information on a plurality of crystalline phases contained in the sample is acquired (S2: qualitative phase analysis result acquisition step). The analysis unit 2 identifies crystalline phases based on the positions and the intensities of a diffraction lines (peaks) of the powder diffraction pattern of the sample acquired in the step S1. That is, the analysis unit 2 acquires information on a plurality of crystalline phases contained in the sample by qualitative phase analysis. In this case, the information on the crystalline phases contains chemical compositions thereof, information on polymorphism when the crystalline phases have polymorphism having different crystal structures, and a plurality of peak positions of powder diffraction patterns of the crystalline phases. The information may further contain intensities at the plurality of peak positions of the powder diffraction patterns of the crystalline phases.

Based on the peak positions and the peak intensities of the powder diffraction pattern of the sample acquired in the step S1, the analysis unit 2 acquires information on the plurality of crystalline phases contained in the sample by subjecting the sample to qualitative phase analysis. However, the present invention is not limited thereto, and the information input unit 3 may acquire the information on the plurality of crystalline phases contained in the sample, which is a result of the qualitative phase analysis of the sample, from the input device 13.

[Step S3: Fitting Function Acquisition Step]

A fitting function for each of a plurality of crystalline phases contained in the sample is acquired (Step S3: fitting function acquisition step). A user determines to execute fitting by using one fitting function, which is selected from the group consisting of first to third fitting functions, for the powder diffraction pattern of each of the plurality of crystalline phases based on information on the powder diffraction pattern of the sample acquired in Step S1 and information on the plurality of crystalline phases acquired in Step S2. The user uses the input device 13 to input a fitting function to be used for each of the plurality of crystalline phases. The analysis unit 2 acquires a fitting function for each of the plurality of crystalline phases, which is input to the input device 13 by the information input unit 3.

Now, a description is given of the first to third fitting functions. When the powder diffraction pattern y(2θ) of the sample can be regarded as superimposition of a background intensity $y(2\theta)_{back}$ and the powder diffraction pattern $y(2\theta)_k$ of each of the K crystalline phases, the powder diffraction pattern y(2θ) of the sample is represented by the following Expression 10.

$$y(2\theta)=y(2\theta)_{back}+\Sigma_{k=1}^{K}y(2\theta)_k \qquad (10)$$

The powder diffraction pattern $y(2\theta)_k$ of each crystalline phase can be represented by various forms, and serves as the fitting function. An integrated intensity acquired through whole-powder pattern decomposition based on a Pawley method is used as the first fitting function, and is represented by the following Expression 11.

$$y(2\theta)_k=\Sigma_j I_{jk} P(2\theta)_{jk} \qquad (11)$$

In this expression, "$P(2\theta)_{jk}$" represents a normalized profile function describing the profile shape. A function defined on an interval [−∞, +∞], for example, a pseudo-Voigt function, is used as P(2θ). However, in actuality, the function may be considered to have a value only around the peak position of each diffraction line.

An integrated intensity obtained through observation or calculation, which is input from the outside, is used as the second fitting function, and is represented by the following Expression 12.

$$y(2\theta)=\Sigma_j Sc_k I'_{jk} P(2\theta)_{jk} \qquad (12)$$

In this expression, "$Sc_k$" represents a scale factor, and is defined by $I_{jk}=Sc_k I'_{jk}$. $\{I'_{jk}\}$, which is a set of integral intensities, may be a set of integral intensities separately measured (or calculated) for a single-phase sample of the k-th crystalline phase, or may be a function of the crystal structure parameter. In fitting, the set $\{I'_{jk}\}$ of integral intensities is fixed, and the scale factor $Sc_k$ is refined instead.

A profile intensity obtained through observation or calculation, which is input from the outside, is used as the third fitting function, and is represented by the following Expression 13.

$$y(2\theta)_k=Sc_k y(2\theta)_k' \qquad (13)$$

In this expression, "$Sc_k$" represents a scale factor similarly to the second fitting function. $y(2\theta)'_k$ may represent a profile intensity separately measured (or calculated) for a single-phase sample of the k-th crystalline phase, and may be calculated at the time of fitting based on the crystal structure parameter. In fitting, the profile intensity $y(2\theta)'_k$ is fixed, and the scale factor $Sc_k$ is refined instead.

The user determines which one of the first to third fitting functions is to be used to perform fitting for the powder diffraction pattern of each of the plurality of crystalline phases based on the information on the powder diffraction pattern of the sample and the information on the plurality of crystalline phases. The first fitting function is desired to be selected when the crystalline phase has a high crystallinity and the symmetry of the crystal is relatively high. In contrast, the second or third fitting function is desired to be used for a crystalline phase having a low symmetry and exhibiting a complex diffraction pattern including a large number of peaks. In particular, when the crystallinity is low and the peak profile has collapsed, the third fitting function may be used.

[Step S4: Whole-Powder Pattern Fitting Step]

The fitting function for each of the plurality of crystalline phases acquired in Step S3 is used to execute whole-powder pattern fitting for the powder diffraction pattern of the sample to acquire a result thereof (Step S4: whole-powder pattern fitting step). In this case, the fitting function to be used for whole-powder pattern fitting is Expression 10, and the fitting function $y(2\theta)_k$ of the k-th crystalline phase described in Expression 10 is any one of the first to third fitting functions.

When the first fitting function is used, the parameter of a model required for calculating the shape of the profile is: (a)

a parameter for determining a full width half maximum (FWHM), (b) a parameter for determining the shape of the profile, and (c) a lattice constant of the k-th crystalline phase. When the first fitting function is used, the initial value of the integrated intensity $I_{jk}$ is not required.

When the second fitting function is used, the parameter of a model required for calculating the shape of the profile includes the above-mentioned parameters (a) to (c) similarly to the case of using the first fitting function, and further includes the scale factor and the parameter of the integrated intensity determined in advance. As described above, the parameter of the integrated intensity is fixed in fitting.

When the third fitting function is used, the parameter of a model required for calculating the shape of the profile includes the scale factor and data on the measured or calculated profile function $y(2\theta)$ from which the background intensity is removed. As described above, the profile function $y(2\theta)$ is fixed in fitting.

Even when any one of the first to third fitting functions is used, the parameter of the background intensity $y(2\theta)_{back}$ is required as described in Expression 10. Those parameters are optimized by fitting to acquire a result thereof.

[Step S5: Weight Ratio Calculation Step]

The weight ratio of the plurality of crystalline phases is calculated based on the fitting result acquired in Step S4 (weight ratio calculation step).

When the first fitting function is used, Expression 7 is used to calculate the parameter $S_k$ of the k-th crystalline phase based on the integrated intensity $I_{jk}$.

When the second fitting function is used, the following Expression 14 is used to calculate the parameter $S_k$ of the k-th crystalline phase based on the scale factor $Sc_k$ and the integrated intensity $I'_{jk}$.

$$S_k = Sc_k \sum_{j=1}^{N_k} I'_{jk} G_{jk} \tag{14}$$

When the third fitting function is used, the following Expression 15 is used to calculate the parameter $S_k$ of the k-th crystalline phase.

$$S_k = Y_k = Sc_k \int_{2\theta_L}^{2\theta_H} y(2\theta)'_k G(2\theta) d(2\theta) \tag{15}$$

Now, a description is given of derivation of Expression 15. $G_{jk}$, which is defined in Expression 2, can be regarded as a continuous function $G(2\theta)$ with respect to the diffraction angle $2\theta$. When $G(2\theta)$ is multiplied by both sides of Expression 11 and integrated over the finite $2\theta$ range of $[2\theta_L, 2\theta_H]$, the following Expression 16 is obtained. The integrated value obtained through this integration is represented by "$Y_k$". It suffices that the $2\theta$ range contains a sufficient number of diffraction lines required for performing quantitative phase analysis as described above.

$$Y_k = \int_{2\theta_L}^{2\theta_H} y(2\theta)_k G(2\theta) d(2\theta) = \sum_{j=1}^{N_k} I_{jk} \int_{2\theta_L}^{2\theta_H} P(2\theta)_{jk} G(2\theta) d(2\theta) \tag{16}$$

As described above, the profile function $P(2\theta)_{jk}$ may be considered to have a value only around the peak position of each diffraction line, and $G(2\theta)$ to be multiplied by the profile function $P(2\theta)_{jk}$ may be considered to have a constant value within that range without producing a significant difference. Further, the profile function $P(2\theta)_{jk}$ is normalized so as to satisfy $\int P(2\theta)_{jk} d(2\theta) = 1$. Thus, $Y_k$ may be considered to be equal to the parameter $S_k$ given in Expression 7. Thus, Expression 15 is derived based on Expression 13 and Expression 16.

As described above, the substance parameter $a_k$ is acquired when the chemical composition of the crystalline phase is determined by qualitative phase analysis. Further, even when the sample contains an uncertain crystalline phase (uncertain crystalline phase) whose chemical composition is uncertain, the substance parameter $a_k$ of such a substance may be estimated. Thus, the weight factor $W_k$ of the k-th crystalline phase is calculated by using the substance parameter $a_k$ and the parameter $S_k$ acquired from the fitting result acquired in Step S4.

Thus, it is possible to calculate the weight ratio of the plurality of crystalline phases contained in the sample by using the weight factor $W_k$. Further, it is possible to calculate the weight fraction $w_k$ of the k-th crystalline phase by using Expression 8 or the IC formula (Expression 9).

Now, a description is given of an example of performing quantitative phase analysis for a mixture sample by using a quantitative phase analysis method according to the embodiment.

Figure 3:
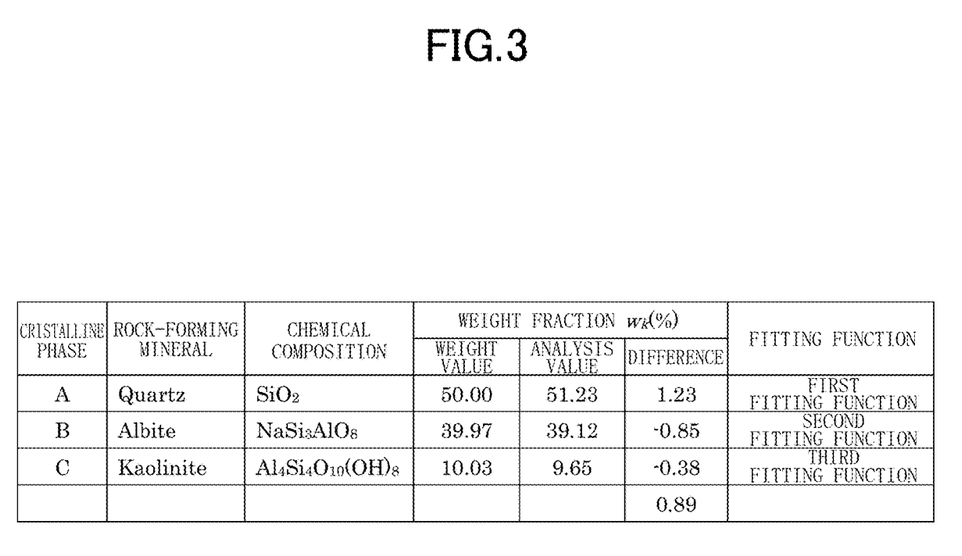
FIG. 3 is a table for showing a sample to be used for an example of the quantitative phase analysis method according to an embodiment of the disclosure.

FIG. 3 is a table for showing a sample to be used for an example of the quantitative phase analysis method according to the embodiment. As shown in FIG. 3, a mixture sample formed of three types of rock-forming minerals (crystalline phase) is used as the sample. The sample simulates a composition ratio of weathering granite that is also used for a ceramic material, and the weight fraction $w_k$ of each crystalline phase is shown in FIG. 3.

Figure 4:
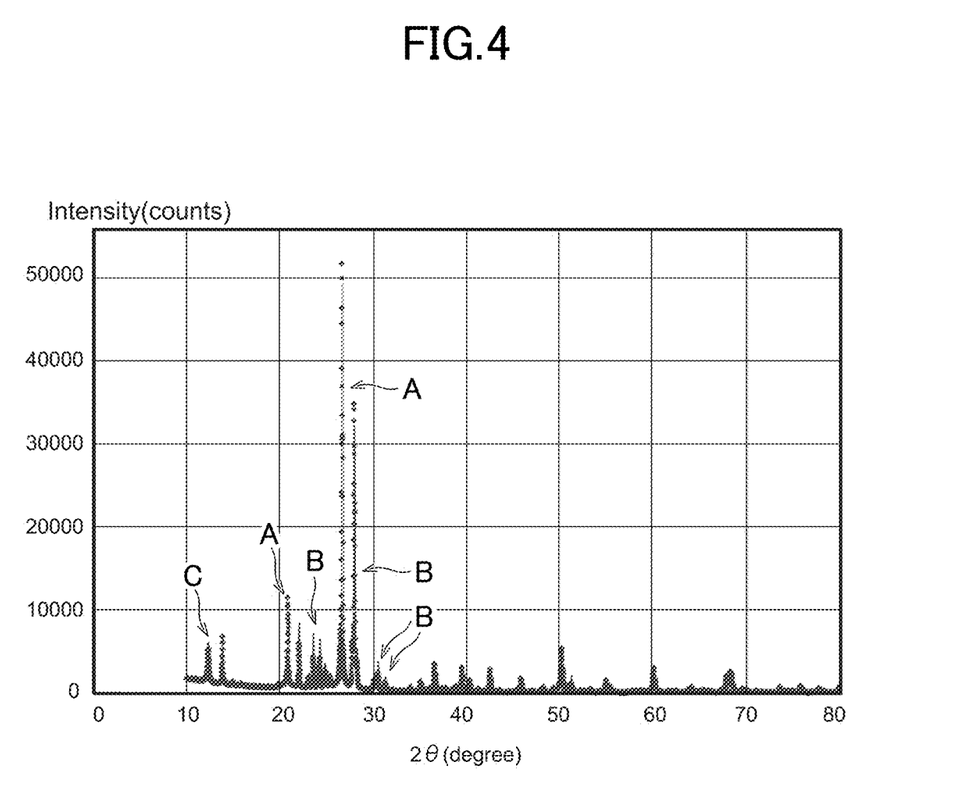
FIG. 4 is a graph for showing an observed powder diffraction pattern and calculated powder diffraction pattern of a sample in an embodiment of the disclosure.

In Step S1, the observed powder diffraction pattern of the sample is acquired. FIG. 4 is a graph for showing the observed powder diffraction pattern and calculated powder diffraction pattern of the sample in the embodiment. The diamond symbol "♦" shown in FIG. 4 is the observed powder diffraction pattern. The measurement is performed within a range in which $2\theta$ takes a value of from 10° to 80°. The calculated powder diffraction pattern is described later.

In Step S2, information on the plurality of crystalline phases contained in the sample is acquired. As shown in FIG. 3, three types of crystalline phases (A, B, and C) are contained in the sample, and the chemical composition of each crystalline phase is known.

In Step S3, the fitting function for each of the plurality of crystalline phases contained in the sample is acquired. In this case, as shown in FIG. 3, the user selects the first fitting function as the fitting function for Quartz being the crystalline phase A, the second fitting function as the fitting function for Albite being the crystalline phase B, and the third fitting function as the fitting function for Kaolinite being the crystalline phase C. Then, the user uses the input device 13 to input a fitting function to be used for each of the crystalline phases A to C, and the analysis unit 2 acquires the fitting function for each of the crystalline phases A to C.

Quartz being the crystalline phase A has a relatively high symmetry of the crystal structure. Thus, even when there are other components at the time of whole-powder pattern decomposition, fitting is easy to perform, and hence the user selects the first fitting function as the fitting function to be used for the crystalline phase A. In this case, the integrated intensity parameters $\{I_{jA}\}$ are all optimized at the time of fitting.

Albite being the crystalline phase B is one type of feldspar, which is a triclinic crystal system having a low symmetry of the crystal structure. For example, 810 diffraction lines are known to exist within a range in which $2\theta$ takes a value of from 5° to 80°. The user selects the second fitting function as the fitting function to be used for the crystalline phase B. The set $\{I_{jB}\}$ of observed integral intensities, which is obtained by whole-powder pattern decomposition already performed for the sample containing Albite as a single component, is acquired. In this case, the set of observed integral intensities acquired in advance are set as the integrated intensity parameters $\{I'_{jB}\}$, and are multiplied by the scale factor for use in calculation of the profile intensity.

Figure 5:
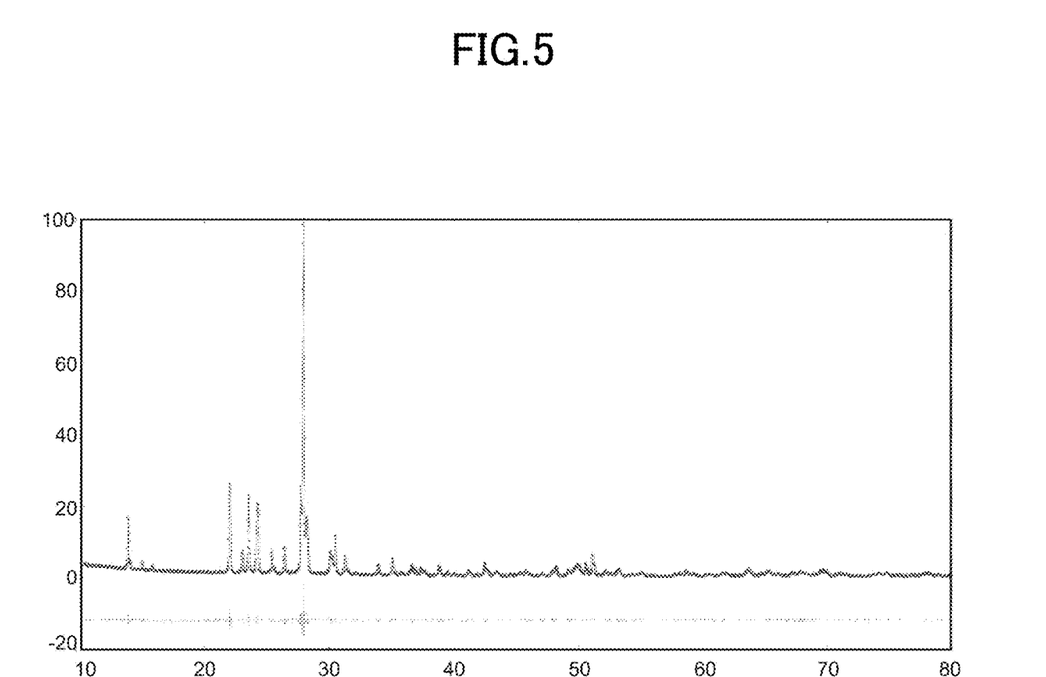
FIG. 5 is a graph for showing a result of whole-powder pattern decomposition for the observed powder diffraction pattern of a sample containing Albite as a single component.

FIG. 5 is a graph for showing a result of whole-powder pattern decomposition for the observed powder diffraction pattern of the sample containing Albite as a single component. The diamond symbol "♦" shown in FIG. 5 represents the observed powder diffraction pattern. The measurement is performed within a range in which 2θ takes a value of from 10° to 80°. The calculated powder diffraction pattern, which is the result of whole-powder pattern decomposition, is superimposed onto the observed powder diffraction pattern and indicated by the solid line. Further, a residual diffraction pattern, which is obtained by subtracting, from the observed powder diffraction pattern, the result of whole-powder pattern decomposition based on a diffraction pattern inserted from the observed powder diffraction pattern, is indicated below the observed powder diffraction pattern, and it is indicated that the whole-powder pattern decomposition accurately fits the observed powder diffraction pattern.

Kaolinite being the crystalline phase C is one type of clay mineral, and is formed by weathering and degeneration of feldspar, for example. Kaolinite is known to have a low crystallinity. Thus, among a plurality of peaks included in the observed powder diffraction pattern of Kaolinite, there are a large number of adjacent peaks superimposed onto each other because those peaks become wider, with the result that the shape of the diffraction profile is not clear. This causes a difficulty in applying the whole-powder pattern decomposition method, which is based on the clear shape of the diffraction profile. Thus, the user selects the third fitting function as the fitting function to be used for the crystalline phase C. The background intensity is removed from the observed powder diffraction pattern of a sample containing Kaolinite as a single component to be acquired as the observed profile intensity $y(2\theta)_c$. In this case, the observed profile intensity acquired in advance is set as the observed profile intensity $y'(2\theta)_c$, and the observed profile intensity $y'(2\theta)_c$ is multiplied by the scale factor to be used for calculating the profile intensity.

Figure 6:
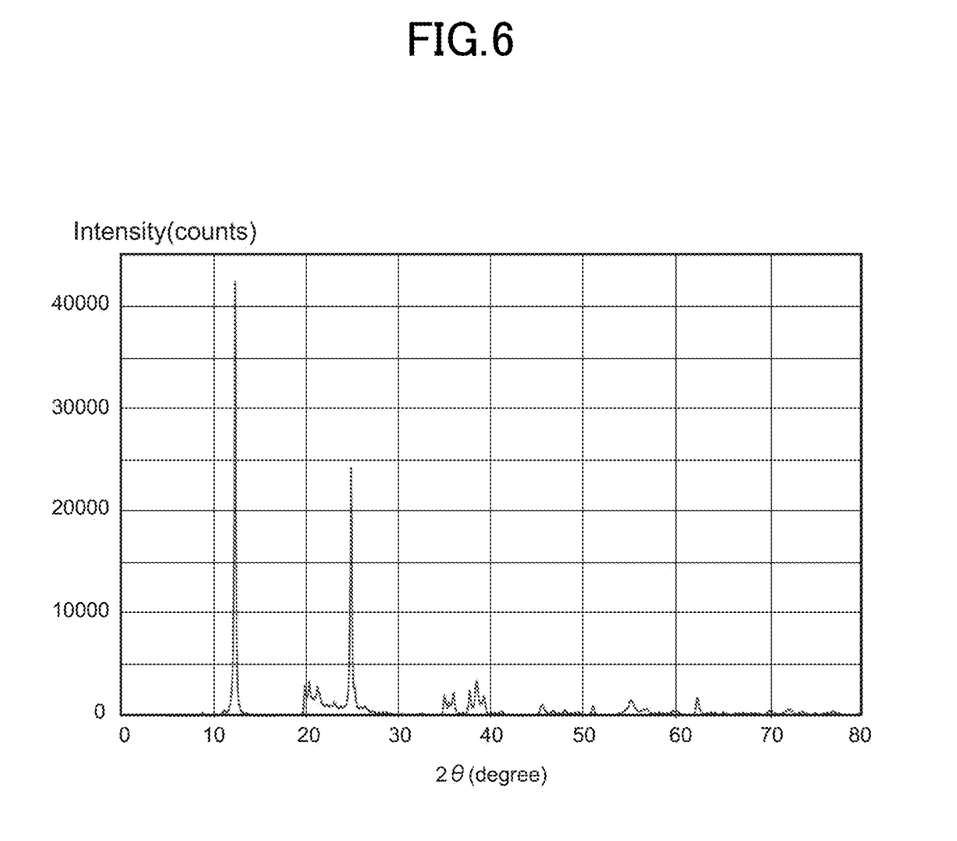
FIG. 6 is a graph for showing a shape of an observed powder diffraction profile obtained by removing a background intensity from the observed powder diffraction pattern of a sample containing Kaolinite as a single component.

FIG. 6 is a graph for showing the shape of the observed powder diffraction profile obtained by removing the background intensity from the observed powder diffraction pattern of the sample containing Kaolinite as a single component. The measurement is performed within a range in which 2θ takes a value of from 5° to 80°. As shown in FIG. 6, the shape of the observed powder diffraction profile of Kaolinite exhibits adhesion in many cases.

In Step S4, the fitting function for each of the plurality of crystalline phases is used to execute whole-powder pattern fitting for the powder diffraction pattern of the sample and acquire a result thereof. As shown in FIG. 3, the fitting functions for the crystalline phases A to C are the first to third fitting functions, respectively. The calculated powder diffraction pattern being the result of whole-powder pattern fitting is shown in FIG. 4. In FIG. 4, three calculated powder diffraction patterns (calculation profile intensities) corresponding to the respective crystalline phases A to C are described, and are shown as curves A to C, respectively, in FIG. 4. As shown in FIG. 4, the three calculated powder diffraction patterns fit the observed powder diffraction pattern accurately.

In Step S5, the weight ratio of the plurality of crystalline phases is calculated based on the fitting result acquired in Step S4. In this case, the weight fraction $w_k$ is acquired, and the result is shown in FIG. 3. As shown in FIG. 3, the weight values (set values) of respective crystalline phases in the sample are 50%, 39.97%, and 10.03%. In contrast, regarding the analysis value of each crystalline phase, the weight fraction $w_A$ of the crystalline phase A is 51.23% (difference: +1.23%), the weight fraction $w_B$ of the crystalline phase B is 39.12% (difference: −0.85%), and the weight fraction we of the crystalline phase C is 9.65% (difference: −0.38%), and thus accurate quantitative phase analysis is implemented for the weight value of each crystalline phase. In the above, a description has been given of the example of performing quantitative phase analysis for the mixture sample by using the quantitative phase analysis method according to the embodiment.

In the above, a description has been given of the quantitative phase analysis method according to the embodiment. With the quantitative phase analysis method according to the embodiment, at the time of fitting using the first to third fitting functions, it is possible to execute fitting as long as the input parameter can be determined, and it is possible to implement quantitative phase analysis as long as the substance parameters $a_k$ of the plurality of crystalline phases contained in the sample can be determined or estimated by qualitative phase analysis.

In the quantitative phase analysis method according to the embodiment, when the sample contains the plurality of crystalline phases, the fitting function for each of the plurality of crystalline phases may be any one of the first to third fitting functions. Even when the fitting function for the powder diffraction pattern of the sample includes any one of one type of, two types of, and three types of fitting functions among the first to third fitting functions, it is possible to execute the whole-powder pattern fitting for the powder diffraction pattern of the sample, and to calculate the weight ratio of the plurality of crystalline phases.

In particular, in the related-art quantitative phase analysis method, it is extremely difficult to execute whole-powder pattern fitting for the powder diffraction pattern of the sample by using two or more types of fitting functions at the same time among the first to third fitting functions. In contrast, in the quantitative phase analysis method according to the embodiment, two or more types of fitting functions may be selected among the first to third fitting functions. The two or three types of fitting functions can be used at the same time to execute whole-powder pattern fitting, to thereby achieve a significant effect.

In the quantitative phase analysis method according to the embodiment, the user determines which one of the first to third fitting functions is appropriate for the fitting function corresponding to each of the plurality of crystalline phases contained in the sample, based on the diffraction pattern of the sample. However, the configuration is not limited thereto. The analysis unit 2 may automatically perform determination by itself, and determine the fitting function for each of the plurality of crystalline phases to acquire a result thereof.

In the embodiment, the powder diffraction pattern of the sample to be subjected to whole-powder pattern fitting includes the background intensity, and thus the fitting function also includes the background intensity. However, the configuration is not limited thereto. The background may be removed in the preprocessing, and the powder diffraction pattern of the sample to be subjected to whole-powder pattern fitting may not include the background intensity. In this case, the fitting function does not include the background intensity.

In the above, the quantitative phase analysis device, the quantitative phase analysis method, and the quantitative phase analysis program according to the embodiment of the disclosure have been described. The disclosure is not limited to the above-mentioned embodiment and can be widely applied. For example, the powder diffraction pattern in the above-mentioned embodiment is obtained by X-ray diffraction measurement. However, the powder diffraction pattern is not limited thereto and may be obtained by another measurement, for example, neutron diffraction measurement. Further, various approximations, such as the determination of diffraction lines included in the powder diffraction pattern and the distribution of intensities of diffraction lines that are superimposed onto each other or close to each other, are considered, as required. In the quantitative phase analysis method in the above-mentioned embodiment, the weight ratio of the plurality of crystalline phases is calculated, but another quantitative ratio, for example, a molar ratio, may be calculated based on such weight ratio.

What is claimed is:

1. A quantitative phase analysis device, which is configured to perform quantitative phase analysis of crystalline phases contained in a sample based on a powder diffraction pattern of the sample, the quantitative phase analysis device comprising:
   at least one processor; and
   at least one memory device that stores a plurality of instructions, which when executed by the at least one processor, cause the at least one processor to:
   acquire the powder diffraction pattern of the sample;
   acquire information on a plurality of crystalline phases contained in the sample;
   acquire a fitting function for each of the plurality of crystalline phases, by selecting one fitting function from the group consisting of a first fitting function that uses an integrated intensity obtained by whole-powder pattern decomposition, a second fitting function that uses an integrated intensity obtained by observation or calculation, and a third fitting function that uses a profile intensity obtained by observation or calculation;
   execute whole-powder pattern fitting for the powder diffraction pattern of the sample by using the fitting function for each of the plurality of crystalline phases, to thereby acquire a fitting result; and
   calculate a weight ratio of the plurality of crystalline phases based on the fitting result,
   wherein the quantitative phase analysis device is configured to select, for the plurality of crystalline phases, two or more types of fitting functions among the first fitting function to the third fitting function.

2. The quantitative phase analysis device according to claim 1, wherein calculating the weight ratio includes calculating a weight fraction by using an intensity-composition (IC) formula.

3. A quantitative phase analysis method for performing quantitative phase analysis of crystalline phases contained in a sample based on a powder diffraction pattern of the sample, the quantitative phase analysis method comprising:
   acquiring the powder diffraction pattern of the sample;
   acquiring information on a plurality of crystalline phases contained in the sample;
   acquiring a fitting function for each of the plurality of crystalline phases, by selecting one fitting function from the group consisting of a first fitting function that uses an integrated intensity obtained by whole-powder pattern decomposition, a second fitting function that uses an integrated intensity obtained by observation or calculation, and a third fitting function that uses a profile intensity obtained by observation or calculation;
   executing whole-powder pattern fitting for the powder diffraction pattern of the sample by using the fitting function for each of the plurality of crystalline phases, to thereby acquire a fitting result; and
   calculating a weight ratio of the plurality of crystalline phases based on the fitting result,
   wherein, for the plurality of crystalline phases, two or more types of fitting functions among the first fitting function to the third fitting function are selected.

4. A non-transitory computer-readable storage medium storing a quantitative phase analysis program for performing quantitative phase analysis of crystalline phases contained in a sample based on a powder diffraction pattern of the sample, the quantitative phase analysis program causing a computer to execute processing comprising:
   acquiring the powder diffraction pattern of the sample;
   acquiring information on a plurality of crystalline phases contained in the sample;
   acquiring a fitting function for each of the plurality of crystalline phases, by selecting one fitting function from the group consisting of a first fitting function that uses an integrated intensity obtained by whole-powder pattern decomposition, a second fitting function that uses an integrated intensity obtained by observation or calculation, and a third fitting function that uses a profile intensity obtained by observation or calculation;
   executing whole-powder pattern fitting for the powder diffraction pattern of the sample by using the fitting function for each of the plurality of crystalline phases, to thereby acquire a fitting result; and
   calculating a weight ratio of the plurality of crystalline phases based on the fitting result,
   wherein, for the plurality of crystalline phases, two or more types of fitting functions among the first fitting function to the third fitting function are selected.

* * * * *